United States Patent
Yang et al.

(10) Patent No.: US 11,205,440 B2
(45) Date of Patent: Dec. 21, 2021

(54) SOUND PLAYBACK SYSTEM AND OUTPUT SOUND ADJUSTING METHOD THEREOF

(71) Applicant: Unlimiter MFA Co., Ltd., Eden Island (SC)

(72) Inventors: Kuo-Ping Yang, Taipei (TW); Kuo-Wei Kao, Taipei (TW); Kai-Yuan Hsiao, Taipei (TW); Jian-Ying Li, Taipei (TW)

(73) Assignee: PIXART IMAGING INC., Hsin-Chu County (TW)

( * ) Notice: Subject to any disclaimer, the term of this patent is extended or adjusted under 35 U.S.C. 154(b) by 145 days.

(21) Appl. No.: 16/691,713

(22) Filed: Nov. 22, 2019

(65) Prior Publication Data

US 2020/0211579 A1    Jul. 2, 2020

(30) Foreign Application Priority Data

Dec. 28, 2018 (TW) ................. 107147837

(51) Int. Cl.
| | |
|---|---|
| *G10L 21/0364* | (2013.01) |
| *G06K 9/00* | (2006.01) |
| *G10L 21/013* | (2013.01) |
| *G10L 17/06* | (2013.01) |
| *G10L 17/00* | (2013.01) |

(52) U.S. Cl.
CPC ...... *G10L 21/0364* (2013.01); *G06K 9/00228* (2013.01); *G10L 17/00* (2013.01); *G10L 17/06* (2013.01); *G10L 21/013* (2013.01); *G06K 2009/00322* (2013.01)

(58) Field of Classification Search
CPC ... G03G 15/5012; G06F 3/017; G06F 16/435; G06F 3/165; G06F 16/33; G06K 9/00228; G06K 2009/00322; G06K 9/00288; G10L 13/027; G10L 15/1815; G10L 17/00; G10L 17/04; G10L 17/06; G10L 21/013; G10L 21/0364; G10L 15/22; H03G 3/32; H03G 5/025; H03G 5/165; H04R 25/70;
(Continued)

(56) References Cited

U.S. PATENT DOCUMENTS 6,813,490 B1 * 11/2004 Lang .................. H04M 1/6016
                                                    455/414.1
9,929,709 B1 * 3/2018 Yang ...................... G10L 17/26
(Continued)

FOREIGN PATENT DOCUMENTS

| CN | 102413218 A | 4/2012 |
|---|---|---|
| CN | 107688451 A | 2/2018 |
| CN | 109002274 A | 12/2018 |

*Primary Examiner* — Gerald Gauthier
(74) *Attorney, Agent, or Firm* — Bacon & Thomas, PLLC

(57) ABSTRACT

A sound playback system and an output sound adjusting method thereof are disclosed. The method includes the following steps: receiving an input sound signal from a user, wherein the input sound signal includes a voice signal indicating the age of the user; transmitting the input sound signal to a remote voice system; performing a voice recognition process according to the voice signal of the input sound signal to obtain a voice recognition result; adjusting a gain value of each frequency band of an output sound signal according to the voice recognition result; and transmitting the output sound signal to a near-end electronic device to output the output sound signal to be heard by the user.

11 Claims, 4 Drawing Sheets

(58) Field of Classification Search
CPC ....... H04R 1/1041; H04W 4/80; A61B 5/121; H04L 67/125; H04S 7/307
USPC ...... 345/156; 455/414.1; 704/246, 251, 247, 704/249
See application file for complete search history.

(56) References Cited

U.S. PATENT DOCUMENTS

| | | | |
|---|---|---|---|
| 10,303,428 B2* | 5/2019 | Yang | G10L 17/04 |
| 10,573,313 B2* | 2/2020 | Mishra | G10L 15/1807 |
| 10,586,534 B1* | 3/2020 | Argyropoulos | G10L 15/22 |
| 10,878,800 B2* | 12/2020 | Truong | G10L 13/027 |
| 10,911,596 B1* | 2/2021 | Do | H04M 3/432 |
| 11,115,539 B2* | 9/2021 | Yang | A61B 5/7264 |
| 2008/0010066 A1* | 1/2008 | Broman | G06Q 20/382 |
| | | | 704/246 |
| 2011/0112838 A1* | 5/2011 | Adibi | G10L 17/02 |
| | | | 704/249 |
| 2014/0006026 A1* | 1/2014 | Lamb | G10L 17/00 |
| | | | 704/246 |
| 2014/0122074 A1* | 5/2014 | Karmarkar | H04K 3/86 |
| | | | 704/246 |
| 2014/0123010 A1 | 5/2014 | Goldstein | |
| 2014/0379343 A1* | 12/2014 | Karimi-Cherkandi | |
| | | | H04M 1/2475 |
| | | | 704/246 |
| 2016/0019887 A1* | 1/2016 | Kim | G10L 15/183 |
| | | | 704/246 |
| 2016/0034251 A1* | 2/2016 | Sendai | G06F 3/167 |
| | | | 345/156 |
| 2017/0094511 A1* | 3/2017 | Na | H04W 12/06 |
| 2017/0099380 A1* | 4/2017 | Lee | H03G 5/025 |
| 2018/0032014 A1* | 2/2018 | Nakatani | G03G 15/553 |
| 2018/0157458 A1* | 6/2018 | Yang | G06F 3/165 |
| 2018/0316795 A1* | 11/2018 | Yang | G10L 13/02 |
| 2019/0065136 A1* | 2/2019 | Yang | G10L 15/22 |
| 2019/0147851 A1* | 5/2019 | Kizuki | G10L 15/22 |
| | | | 704/251 |
| 2019/0147890 A1* | 5/2019 | Page | G10L 17/00 |
| | | | 704/246 |
| 2019/0165750 A1* | 5/2019 | Goldman-Shenhar | |
| | | | H03G 7/007 |
| 2019/0180747 A1* | 6/2019 | Back | G06F 16/33 |
| 2019/0310707 A1* | 10/2019 | Hwang | G06F 3/015 |
| 2019/0334619 A1* | 10/2019 | Aoyama | G06K 9/2054 |
| 2019/0347062 A1* | 11/2019 | Lyon | G06F 3/165 |
| 2019/0349683 A1* | 11/2019 | Anders | H04S 7/307 |
| 2020/0076392 A1* | 3/2020 | Wang | H04R 3/04 |
| 2020/0176010 A1* | 6/2020 | Anders | H04M 3/568 |
| 2020/0194004 A1* | 6/2020 | Bates | G10L 15/22 |
| 2020/0211579 A1* | 7/2020 | Yang | G10L 17/06 |

* cited by examiner

SOUND PLAYBACK SYSTEM AND OUTPUT SOUND ADJUSTING METHOD THEREOF

BACKGROUND OF THE INVENTION

1. Field of the Invention

The present invention relates to a sound playback system and an output sound adjusting method thereof, particularly to a sound playback system and an output sound adjusting method thereof capable of adjusting the output sound according to the user's age.

2. Description of the Related Art

The advancement of technology has led to the development of many voice assistant programs, such as Apple's Siri, Google's Google Now, Microsoft's Cortana, and Amazon's Alexa. A user can directly speak with a voice assistant program using a device such as a mobile phone or a tablet. On the other hand, users of different ages have different degrees of hearing loss for different frequencies and also have different tolerances of sound pressure level, so users of different ages will have different personal hearing curves. Especially as humans grow older, the audio frequency range that the ear can detect is reducing. For higher frequency sounds, the situation of hearing loss is particularly obvious. However, the present voice assistant programs do not take the user's age into account to adjust the personal hearing curve of the output sound based on the user's age.

Accordingly, it is necessary to devise a new sound playback system and an output sound adjusting method thereof to solve the problem of the prior art.

SUMMARY OF THE INVENTION it is a major objective of the present invention to provide a sound playback system with the effect of adjusting the output sound according to the user's age.

It is another major objective of the present invention to provide an output sound adjusting method used for the sound playback system described above.

To achieve the abovementioned object, the sound playback system comprises a near-end electronic device and a remote voice system. The near-end electronic device comprises a sound receiving module, a transmission module, and a sound module. The sound receiving module is used for receiving an input sound signal emitted by a user, wherein the input sound signal comprises a voice signal representing the user's age. The transmission module is electrically connected to the sound receiving module for transmitting the input sound signal to the network. The sound module is electrically connected to the transmission module for emitting an output sound signal to be heard by the user. The remote voice system is connected to the near-end electronic device via the network for transmitting the output sound signal to the near-end electronic device. The remote voice system comprises a recognition module, an equalizer, and a processing module. The recognition module is used for receiving the input sound signal to execute a voice recognition process according to the voice signal of the input sound signal so as to obtain a voice recognition result. The equalizer is used for adjusting a gain value of each frequency band of the output sound signal. The processing module is electrically connected to the recognition module and the equalizer and is used for controlling the equalizer to adjust the gain value of each frequency band of the output sound signal according to the voice recognition result so as to transmit the output sound signal to the near-end electronic device to emit the output sound signal from the sound module.

The output sound adjusting method of the present invention comprises the following steps: receiving an input sound signal emitted by the user, wherein the input sound signal comprises a voice signal representing the user's age; transmitting the input sound signal to the remote voice system; executing a voice recognition process according to the voice signal of the input sound signal to obtain a voice recognition result; adjusting a gain value of each frequency band of the output sound signal according to the voice recognition result; and transmitting the output sound signal to the near-end electronic device so as to emit the output sound signal to be heard by the user.

DETAILED DESCRIPTION OF THE PREFERRED EMBODIMENT

Hereafter, the technical content of the present invention will be better understood with reference to preferred embodiments.

Figure 1:
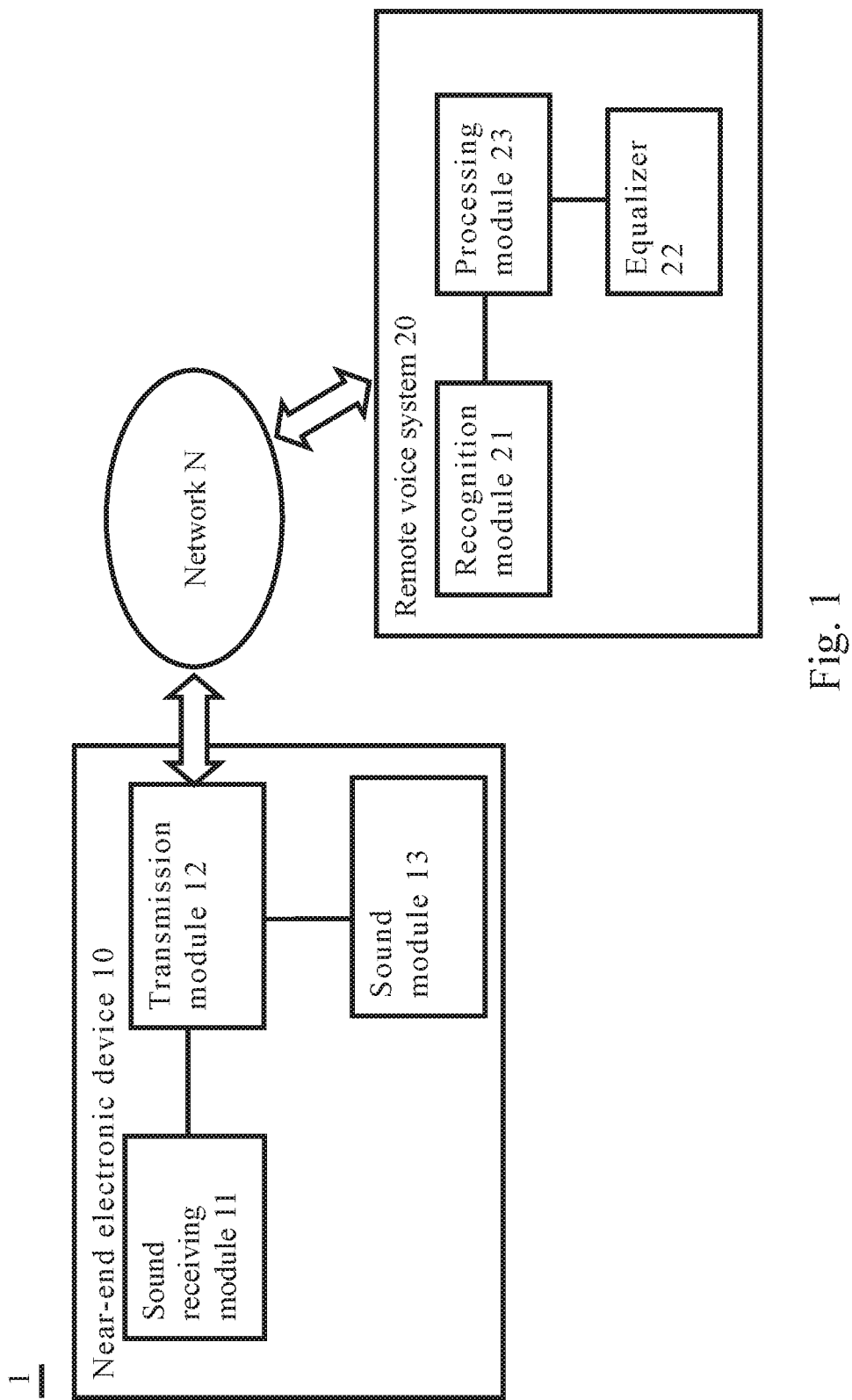
FIG. 1 is an architecture diagram of a sound playback system of the first embodiment of the present invention.

Please first refer to FIG. 1 for an architecture diagram of a sound playback system of the first embodiment of the present invention.

The sound playback system 1 of the present invention comprises a near-end electronic device 10 and a remote voice system 20. The near-end electronic device 10 may be a smart phone, a tablet or a notebook computer, but the present invention is not limited thereto. The near-end electronic device 10 is used by a user and connected to a remote voice system 20 via the network N. The remote voice system 20 can be any artificial intelligence voice system, such as Apple's Siri, Google's Google Now, Microsoft's Cortana, and Amazon's Alexa, but the present invention is not limited thereto.

The near-end electronic device 10 comprises a sound receiving module 11, a transmission module 12, and a sound module 13. The sound receiving module 11 can be a microphone to receive an input sound signal emitted by the user. The input sound signal comprises a voice signal representing the user's age. For example, the user can say "Alexa, I am 60 years old. Please setup my EQ." The transmission module 12 is electrically connected to the sound receiving module 11 to transmit the input sound signal to the network N. The transmission module 12 can be wiredly or wirelessly connected to the network N, but the present invention does not limit its connection method. The sound module 13 is electrically connected to the transmission module 12. The sound module 13 can be a speaker or an earphone for emitting an output sound signal from the remote voice system 20 to be heard by the user.

The remote voice system 20 comprises a recognition module 21, an equalizer 22, and a processing module 23. The recognition module 21 is used for receiving the input sound signal to execute a voice recognition process according to the voice signal of the input sound signal so as to obtain a voice recognition result. The equalizer (EQ) 22 is used for adjusting a gain value of each frequency band of the output sound signal. The equalizer 22 is a tool that can be used to adjust the output sound. It can change the gain value of the sound in different frequency bands. Therefore, it is often used to adjust the output sound effect. The processing module 23 is electrically connected to the recognition module 21 and the equalizer 22 and is used for controlling the equalizer 22 to adjust the gain value of each frequency band of the output sound signal according to the voice recognition result. As a result, the output sound signal is transmitted to the near-end electronic device 10 and emitted by the sound module 13 to be heard by the user. The aforementioned output sound signal is the sound which is generated by the remote voice system 20 after the controlling of the processing module 23 and is transmitted to the sound module 13. Therefore, the processing module 23 is able to adjust a sound signal based on the user's own situation. For example, for an elderly user, the processing module 23 can control the equalizer 22 to increase the volume of the high frequency band of the output sound signal to make it easier for the elderly user to hear.

Figure 2:
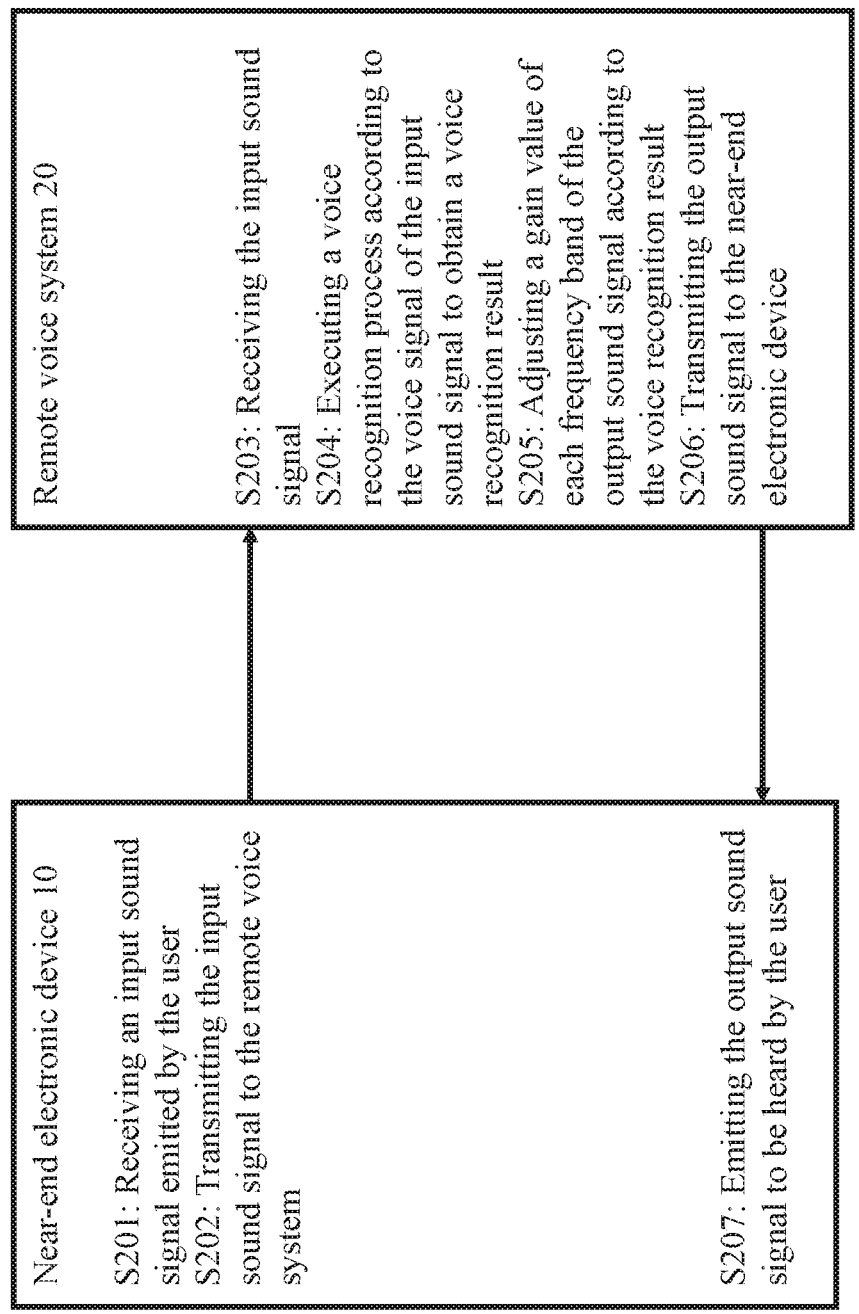
FIG. 2 is a flowchart showing the steps in an output sound adjusting method of the first embodiment of the present invention.

Now please refer to FIG. 2, which is a flowchart showing steps in an output sound adjusting method of a first embodiment of the present invention. It should be noted here that although the sound playback system 1 is used as an example to illustrate the output sound adjusting method of the present invention, the output sound adjusting method of the present invention is not limited to the use of the sound playback system 1 using the same structure as described above.

Step S201 is first performed: receiving an input sound signal emitted by the user.

First, the sound receiving module 11 is used for receiving an input sound signal emitted by the user, wherein the input sound signal comprises a voice signal representing the user's age.

Next is Step S202: transmitting the input sound signal to the remote voice system 20.

The transmission module 12 transmits the input sound signal to the remote voice system 20 via the network N.

Then the remote voice system 20 executes Step S203: receiving the input sound signal.

Then the remote voice system 20 receives the input sound signal.

Then Step S204 is performed: executing a voice recognition process according to the voice signal of the input sound signal to obtain a voice recognition result.

The recognition module 21 receives the input sound signal to execute a voice recognition process according to the voice signal of the input sound signal so as to obtain a voice recognition result. For example, if the user says, "Alexa, I am 60 years old.", the voice recognition result of the recognition module 21 will be 60 years old.

Then Step S205 is performed: adjusting a gain value of each frequency band of the output sound signal according to the voice recognition result.

The processing module 23 is used for controlling the equalizer 22 to adjust a gain value of each frequency band of the output sound signal according to the voice recognition result. For example, for an elderly user, the equalizer 22 is controlled to increase the volume of the high frequency band of the output sound signal. Thus, the entire output sound signal generated by the remote voice system 20 will be adjusted by the equalizer 22.

Then Step S206 is performed: transmitting the output sound signal to the near-end electronic device.

After being adjusted by the equalizer 22, the output sound signal is outputted from the remote voice system 20 to the near-end electronic device 10.

Finally, Step S207 is performed: emitting the output sound signal to be heard by the user.

Finally, the sound module 13 emits the adjusted output sound signal to be heard ley the user. As a result, the processing module 23 is able to adjust a sound signal to make it suitable for the user's own situation.

Figure 3:
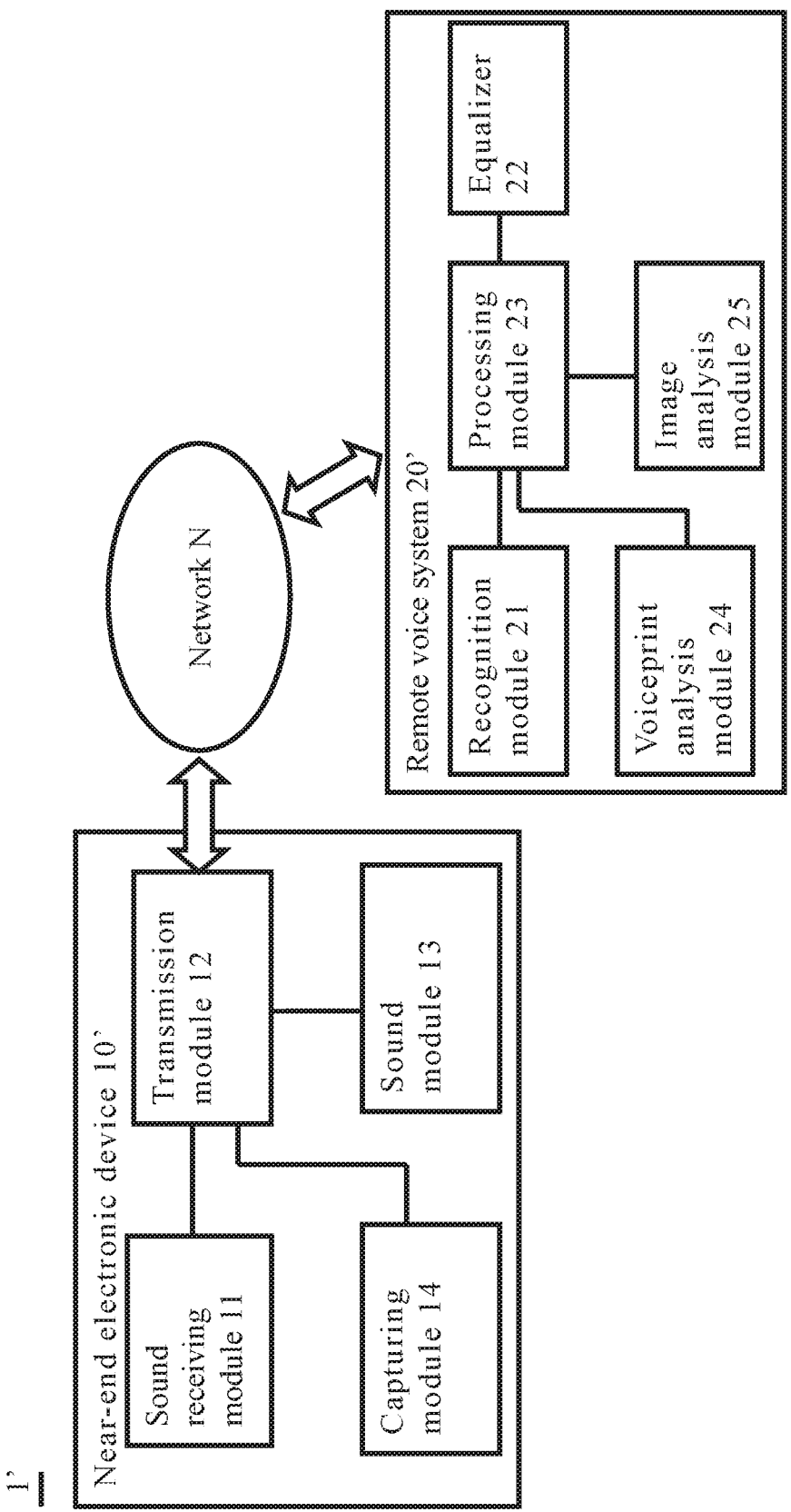
FIG. 3 is an architecture diagram of a sound playback system of the second embodiment of the present invention.

Now please refer to FIG. 3, which is an architecture diagram of a sound playback system of the second embodiment of the present invention.

In the second embodiment of the present invention, the near-end electronic device 10' of the sound playback system 1' further comprises a capturing module 14 used for capturing a facial image of the user. The remote voice system 20' further comprises a voiceprint analysis module 24 and an image analysis module 25. The voiceprint analysis module 24 is used for executing a voiceprint analysis process based on the input sound signal to obtain an age analysis result. The image analysis module 25 is used for executing an image analysis process based on the facial image to obtain a facial image analysis result. The remote voice system 20' may have only the voiceprint analysis module 24 or the image analysis module 25, and the near-end electronic device 10' may not have the capturing module 14. The remote voice system 20 may perform only voiceprint analysis or image analysis, but the present invention is not limited thereto.

Thus, the processing module 23 can control the equalizer 22 to adjust the gain value of each frequency band of the output sound signal based on the facial image analysis result, the voice recognition result, and the age analysis result at the same tune. When the facial image analysis result, the voice recognition result, and the age analysis result are different, the processing module 23 can control the equalizer 22 to adjust the gain value of each frequency band of the output sound signal based on only one result. In one embodiment of the present invention, the judgment of the processing module 23 can prioritize the facial image analysis result or the age analysis result. When the facial image analysis result or the age analysis result is different from the voice recognition result, the data of the voice recognition result will not be considered. For example, if the voice recognition result recognized by the recognition module 21 is 60 years old but the age analysis result of the voiceprint analysis module 24 is 50 years old, the processing module 23 will control the equalizer 22 to adjust the gain value of each frequency band of the output sound signal based on the age analysis result. Alternatively, if the image analysis module 25 identifies the age of the user as 40 years old, the processing module 23 can also control the equalizer 22 to adjust the gain value of each frequency band of the output sound signal based on the facial image analysis result. Furthermore, the processing module 23 of the present invention is not limited to adjusting the gain value of each frequency band of the output sound signal based on only one of the data and may also take the maximum value, minimum value or average value of different data.

It should be noted that each of the above mentioned modules may be a hardware device, a software program combined with a hardware device, or a firmware combined with a hardware device, etc. Further, the preferred embodiments of the present invention described above are merely illustrative. To avoid redundancy, not all possible combinations of changes are documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on design needs. Other modules or elements may not necessarily exist between any two of the modules.

Figure 4:
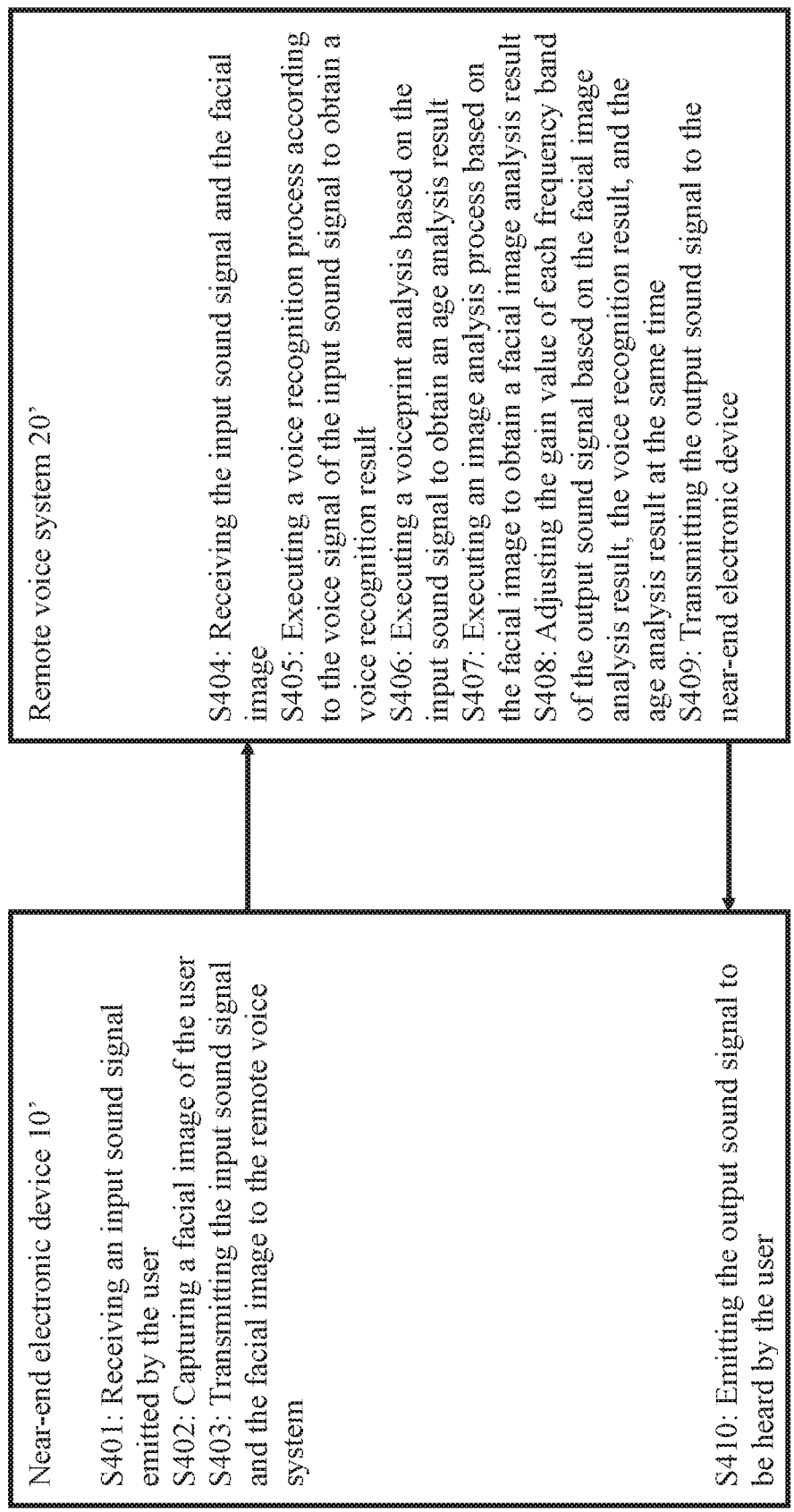
FIG. 4 is a flowchart showing the steps in an output sound adjusting method of the second embodiment of the present invention.

Now please refer to FIG. 4, which is a flowchart showing steps in an output sound adjusting method of a second embodiment of the present invention.

Step S401 is first performed: receiving an input sound signal emitted by the user, and Step S402 is performed at the same time: capturing a facial image of the user.

In addition to the sound receiving nodule 11 for receiving the input sound signal from the user, the capturing module 14 is used to capture a facial image of the user.

Then Step S403 is performed: transmitting the input sound signal and the facial image to the remote voice system.

Then the transmission module 12 transmits the input sound signal and the facial image to the network N, and the remote voice system 20' performs Step S404: receiving the input sound signal and the facial image.

Then Step S405 is performed: executing a voice recognition process according to the voice signal of the input sound signal to obtain a voice recognition result.

Step S405 is the same as Step S204 in that the recognition module 21 is used to execute a voice recognition process according to the voice signal of the input sound signal to obtain a voice recognition result.

At the same time, Step S406 is performed: executing a voiceprint analysis process based on the input sound signal to obtain an age analysis result.

The voiceprint analysis module 24 also executes a voiceprint analysis process based on the input sound signal to obtain an age analysis result.

Then Step S407 is performed: executing an image analysis process based on the facial image to obtain a facial image analysis result.

The image analysis module 25 is used for executing an image analysis process based on the facial image to obtain a facial image analysis result.

Then Step S408 is performed: adjusting the gain value of each frequency band of the output sound signal based on the facial image analysis result, the voice recognition result, and the age analysis result at the same time.

The processing module 23 controls the equalizer 22 to adjust the gain value of each frequency band of the output sound signal based on the facial image analysis result, the voice recognition result, and the age analysis result at the same time; thus Step S409 is performed: transmitting the output sound signal to the near-end electronic device. When the facial image analysis result or the age analysis result does not match the voice recognition result, the facial image analysis result or the age analysis result is taken as the standard, and the data of the voice recognition result is not considered first.

It should be noted that, in different embodiments, the present invention may also perform only Step S406 for voiceprint analysis or only Step S407 for image analysis. The present invention is not limited to adjustment according to the facial image analysis result, the voice recognition result, and the age analysis result at the same time.

Finally, Step S410 is performed: emitting the output sound signal to be heard by the user.

Finally, the sound module 13 emits the adjusted output sound signal to be heard by the user.

It should be noted here that the output sound adjusting method of the present invention is not limited to the order of the above steps. As long as the objectives of the present invention can be achieved, the order of the above steps can also be changed.

In this way, the sound playback system 1 or 1' of the present invention can be used for adjusting the output sound to generate a best sound signal for the user according to the age of the user.

It is noted that the abovementioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An output sound adjusting method used for allowing a user to operate a near-end electronic device to adjust an output sound signal emitted by a remote voice system, the method comprising the following steps:
   receiving an input sound signal emitted by the user, wherein the input sound signal comprises a voice signal representing the user's age;
   transmitting the input sound signal to the remote voice system;
   executing a voice recognition process according to the voice signal of the input sound signal to obtain a voice recognition result;
   executing a voiceprint analysis process based on the input sound signal to obtain an age analysis result;
   capturing a facial image of the user;
   executing an image analysis process based on the facial image to obtain a facial image analysis result;
   referring to the facial image analysis result, the voice recognition result, and the age analysis result at the same time so as to adjust a gain value of each frequency band of the output sound signal; and
   transmitting the output sound signal to the near-end electronic device so as to emit the output sound signal to be heard by the user.

2. The output sound adjusting method as claimed in claim 1, further comprising the following steps:
   when the facial image analysis result, the voice recognition result, and the age analysis result are different, the gain value of each frequency band of the output sound signal is adjusted according to the facial image analysis result or the age analysis result.

3. The output sound adjusting method as claimed in claim 1, further comprising the following steps:
   when the voice recognition result and the facial image analysis result are different, the gain value of each frequency band of the output sound signal is adjusted according to the facial image analysis result.

4. A sound playback system, comprising:
   a near-end electronic device, comprising:
   a sound receiving module for receiving a input sound signal emitted by a user, wherein the input sound signal comprises a voice signal representing the user's age;

a transmission module, electrically connected to the sound receiving module for transmitting the input sound signal to a network; and a sound module, electrically connected to the transmission module for emitting an output sound signal to be heard by the user; and a remote voice system, connected to the near-end electronic device via the network for transmitting the output sound signal to the near-end electronic device to emit the output sound signal from the sound module, the remote voice system comprising:

a recognition module, for receiving the input sound signal to execute a voice recognition process according to the voice signal of the input sound signal so as to obtain a voice recognition result;

an equalizer, for adjusting a gain value of each frequency band of the output sound signal; and a processing module, electrically connected to the recognition module and the equalizer, for controlling the equalizer to adjust the gain value of each frequency band of the output sound signal according to the voice recognition result so as to transmit the output sound signal to the near-end electronic device to emit the output sound signal from the sound module.

5. The sound playback system as claimed in claim 4, wherein the remote voice system further comprises a voiceprint analysis module used for executing a voiceprint analysis process based on the input sound signal to obtain an age analysis result, such that the processing module compares the voice recognition result and the age analysis result so as to control the equalizer to adjust the gain value of each frequency band of the output sound signal.

6. The sound playback system as claimed in claim 5, wherein when the voice recognition result and the age analysis result are different, the processing module controls the equalizer to adjust the gain value of each frequency band of the output sound signal according to the age analysis result.

7. The sound playback system as claimed in claim 5, wherein the near-end electronic device further comprises a capturing module used for capturing a facial image of the user; the remote voice system further comprises an image analysis module used for executing an image analysis process based on the facial image to obtain a facial image analysis result, such that the processing module compares the facial image analysis result, the voice recognition result, and the age analysis result to control the equalizer to adjust the gain value of each frequency band of the output sound signal.

8. The sound playback system as claimed in claim 7, wherein when the facial image analysis result, the voice recognition result, and the age analysis result are different, the processing module controls the equalizer to adjust the gain value of each frequency band of the output sound signal according to the facial image analysis result or the age analysis result.

9. The sound playback system as claimed in claim 4, wherein the near-end electronic device further comprises a capturing module used for capturing a facial image of the user and the remote voice system further comprises an image analysis module used for executing an image analysis process based on the facial image to obtain a facial image analysis result, such that the processing module compares the facial image analysis result and the voice recognition result to control the equalizer to adjust the gain value of each frequency band of the output sound signal.

10. The sound playback system as claimed in claim 9, wherein when the voice recognition result and the facial image analysis result are different, the processing module controls the equalizer to adjust the gain value of each frequency band of the output sound signal according to the facial image analysis result.

11. A remote voice system, for receiving an input sound signal from a near-end electronic and transmitting an output sound signal to the near-end electronic correspondingly, the remote voice system comprising:

a recognition module, for receiving the input sound signal to execute a voice recognition process according to a voice signal of the input sound signal so as to obtain a voice recognition result;

an equalizer, for adjusting a gain value of each frequency band of the output sound signal; and a processing module, electrically connected to the recognition module and the equalizer, for controlling the equalizer to adjust the gain value of each frequency band of the output sound signal according to the voice recognition result so as to transmit the output sound signal to the near-end electronic device.

* * * * *